(12) United States Patent
Hardeman et al.

(10) Patent No.: US 11,197,537 B2
(45) Date of Patent: Dec. 14, 2021

(54) SYSTEMS, METHODS, AND DEVICES FOR PROVIDING GUIDANCE AND FEEDBACK BASED ON LOCATION AND PERFORMANCE

(71) Applicant: KONINKLIJKE PHILIPS N.V., Eindhoven (NL)

(72) Inventors: Toon Hardeman, 's-Hertogenbosch (NL); Teunis Vliegenthart, Eindhoven (NL); Arjen Den Hamer, Helmond (NL); Vincent Jeanne, Migne Auxances (FR); Jan Wojciech Obrebski, Waalre (NL); Yekaterina Borisenko, Lynnwood, WA (US); Martin John Edwards, Solihull (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 342 days.

(21) Appl. No.: 16/065,166

(22) PCT Filed: Dec. 12, 2016

(86) PCT No.: PCT/IB2016/057524
§ 371 (c)(1),
(2) Date: Jun. 22, 2018

(87) PCT Pub. No.: WO2017/109633
PCT Pub. Date: Jun. 29, 2017

(65) Prior Publication Data
US 2019/0008270 A1      Jan. 10, 2019

Related U.S. Application Data

(60) Provisional application No. 62/270,653, filed on Dec. 22, 2015.

(51) Int. Cl.
*A46B 15/00* (2006.01)
*G09B 19/00* (2006.01)
*G06F 3/048* (2013.01)

(52) U.S. Cl.
CPC ........ *A46B 15/0006* (2013.01); *A46B 15/004* (2013.01); *A46B 15/0008* (2013.01);
(Continued)

(58) Field of Classification Search
CPC ............ G09B 19/0084; A46B 15/0006; A46B 15/0008; A46B 15/0012; A46B 15/004; A46B 15/0046; A46B 2200/1066
See application file for complete search history.

(56) References Cited

U.S. PATENT DOCUMENTS 5,944,531 A * 8/1999 Foley ................... G09B 23/283
                                                          434/262
6,536,068 B1* 3/2003 Yang .................. A46B 15/0002
                                                           15/105
(Continued)

FOREIGN PATENT DOCUMENTS

CN         104886921 A       9/2015
DE    102008027317 A1       12/2009
(Continued)

*Primary Examiner* — Eddy Saint-Vil

(57) ABSTRACT

Systems, methods, and devices for providing feedback to an individual based on brushing performance, and providing guidance for the individual's brushing, are provided herein. In one exemplary embodiment, after an oral hygiene device is orientated, a determination is made as to a segment within the individual's mouth that a brush head of the oral hygiene device is located. Upon this determination being made, a sub-segment within the individual's mouth where the brush head is located is also determined. A brushing performance within the sub-segment is calculated and displayed to the user. A level of compliance for the particular segment is determined based on the brushing performance of the vari- (Continued)

ous sub-segments within the particular segment. If the level of compliance exceeds a pre-set compliance level for that segment, the individual is guided to a different segment within their mouth for brushing.

17 Claims, 9 Drawing Sheets

(52) U.S. Cl.
CPC ...... *A46B 15/0012* (2013.01); *A46B 15/0046* (2013.01); *G06F 3/048* (2013.01); *G09B 19/0084* (2013.01); *A46B 2200/1066* (2013.01)

(56) References Cited

U.S. PATENT DOCUMENTS

| | | | |
|---|---|---|---|
| 8,393,037 | B2 | 3/2013 | Iwahori et al. |
| 9,105,197 | B2 * | 8/2015 | Meriheinae ......... A46B 15/0002 |
| 9,552,743 | B2 * | 1/2017 | Meriheinae ......... G09B 19/0084 |
| 2006/0040246 | A1 * | 2/2006 | Ding ................ G09B 19/0084 434/263 |
| 2007/0270221 | A1 | 11/2007 | Park et al. |
| 2009/0092955 | A1 * | 4/2009 | Hwang ............. A46B 15/0002 434/263 |
| 2009/0130636 | A1 * | 5/2009 | Hwang ............. G06Q 40/08 433/216 |
| 2009/0215015 | A1 * | 8/2009 | Chu ................. A46B 15/0006 434/238 |
| 2010/0175208 | A1 * | 7/2010 | Hilfinger ......... G09B 19/0084 15/22.1 |
| 2011/0010876 | A1 * | 1/2011 | Iwahori ............ A46B 15/0002 15/22.1 |
| 2011/0041269 | A1 | 2/2011 | Iwahori |
| 2011/0275424 | A1 | 11/2011 | Schmid et al. |
| 2012/0251975 | A1 | 10/2012 | Iwahori |
| 2012/0266397 | A1 | 10/2012 | Iwahori |
| 2013/0137074 | A1 | 5/2013 | Meriheinae et al. |
| 2014/0065588 | A1 * | 3/2014 | Jacobson .......... G09B 19/0084 434/263 |
| 2014/0246049 | A1 * | 9/2014 | Ikkink ............. A46B 15/0006 134/6 |
| 2015/0044629 | A1 | 2/2015 | Wang et al. |
| 2015/0230593 | A1 | 8/2015 | Doll |
| 2016/0022398 | A1 * | 1/2016 | Vetter ................. A61C 19/04 433/27 |
| 2016/0343270 | A1 * | 11/2016 | Zheng .............. A46B 15/0012 |
| 2017/0303673 | A1 * | 10/2017 | Van Gool .......... A61B 5/6898 |

FOREIGN PATENT DOCUMENTS

| | | |
|---|---|---|
| GB | 2519579 A | 4/2015 |
| WO | 2009107047 A1 | 9/2009 |
| WO | 2014016718 A1 | 1/2014 |
| WO | 2014036423 A1 | 3/2014 |
| WO | 2015059443 A1 | 4/2015 |
| WO | 2015092125 A1 | 6/2015 |

\* cited by examiner

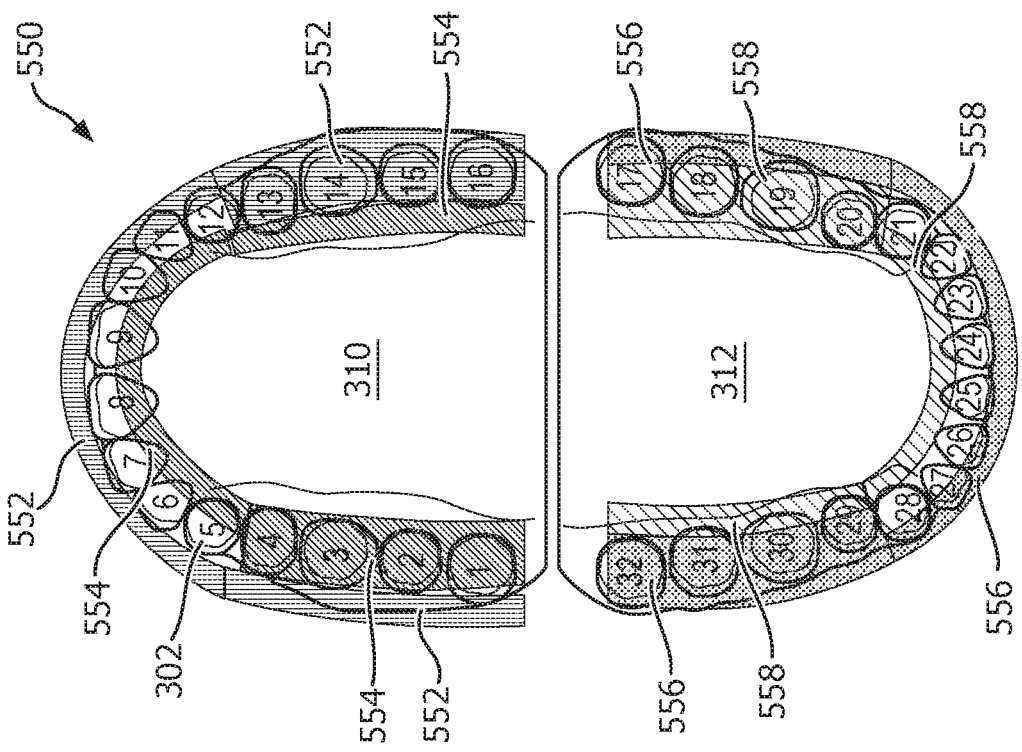
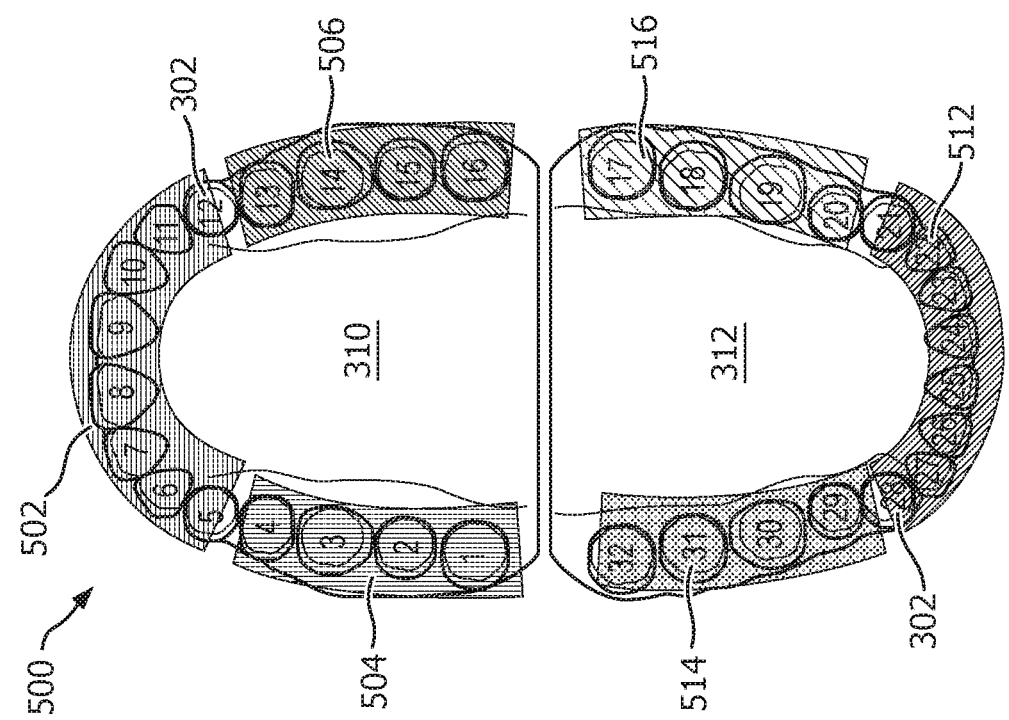
FIG. 5A
FIG. 5B

SYSTEMS, METHODS, AND DEVICES FOR PROVIDING GUIDANCE AND FEEDBACK BASED ON LOCATION AND PERFORMANCE

CROSS-REFERENCE TO PRIOR APPLICATIONS

This application is the U.S. National Phase application under 35 U.S.C. § 371 of International Application No. PCT/IB2016/057524, filed on Dec. 12, 2016, which claims the benefit of U.S. Provisional Patent Application No. 62/270,653, filed on Dec. 22, 2015. These applications are hereby incorporated by reference herein.

BACKGROUND OF THE INVENTION

1. Field of the Invention

The present disclosure generally relates to oral hygiene devices and, in particular, oral hygiene devices including at least one motion sensor configured to provide guidance to an individual based, at least in part, on the individual's cleaning performance. Furthermore, the present disclosure is also generally related to techniques for determining a location of an oral hygiene device, and in particular an inter-oral assembly of the oral hygiene device, within an individual's mouth, and for providing guidance and feedback based on the location of the brush head.

2. Description of the Related Art

Correct oral hygiene techniques are difficult for individuals to maintain over time, especially for individuals lacking formal dental education. While individuals can be shown the proper ways to care for their teeth, such correct techniques can be easily, and quickly, forgotten or may simply erode over time. Previous systems have attempted to provide a guidance related techniques to help individuals achieve suitable oral hygiene care levels, however these systems are typically restrictive and overly limiting. For example, an individual may be instructed to brush a specific tooth, and only when that tooth is cleaned, or after a predefined period of time, the individual is then instructed to move on to clean an adjacent (or different) tooth. This process is then repeated until all the teeth in an individual's mouth are cleaned.

Unfortunately, this process does not allow an individual to have the freedom to clean their teeth as they wish. The user is "forced" to clean one tooth (or group of teeth), and then move to a subsequent tooth (or subsequent set of teeth). Furthermore, the individuals are not able to receive finer details on their oral hygiene cleaning technique based on a granular level of input. For instance, the user cannot receive feedback on a specific tooth or set of teeth being cleaned while only generally being instructed to brush within a region of their mouth where that tooth, or set of teeth, is located. Therefore, it would be beneficial for there to be systems, methods, and devices that enable a user to receive enhanced feedback on their oral hygiene cleaning performance based on a minimal amount of guidance, thereby greatly improving the overall cleaning experience for the individual.

Furthermore, such restrictive oral hygiene cleaning instructions do not account for past history of an individual's oral hygiene cleaning performance to modify current oral hygiene cleaning techniques. For example, setting a pre-defined amount of time, or simply checking to see if all surfaces of one tooth are cleaned, and then instructing the individual to move to the next tooth, reduces the likelihood of the individual providing different or modified cleaning techniques to different teeth based on the individual's oral hygiene cleaning history. As an illustrative example, such existing systems fail to account for individuals who may have forgotten to clean a certain area of their mouth, or did not provide an adequate level of teeth cleaning, in a previous brushing session. Providing enhanced guidance and feedback for the individual based on that individual's previous oral hygiene cleaning history significantly improves the overall cleaning quality and, consequently, the individual's oral hygiene.

SUMMARY OF THE INVENTION

Accordingly, it is an objective of this disclosure to provide an oral hygiene device, such as an electronic toothbrush, that is capable of providing feedback to a user of the oral hygiene device based on the user's oral hygiene cleaning performance. This objective is achieved according to the present disclosure by analyzing motion characteristics of the oral hygiene device and, based on motion sensing data acquired from at least one motion sensor included within the oral hygiene device, providing feedback corresponding to the user's oral hygiene cleaning performance to the user. Furthermore, it is another objective of this disclosure to provide guidance to a user of an oral hygiene device, and also to provide enhanced feedback to the user based on the guidance. Still further, it is yet another objective of this disclosure to provide guidance to a user operating an oral hygiene device based on the user's past oral hygiene cleaning performance.

In an exemplary, non-limiting embodiment, a method for providing feedback based on cleaning performance to an individual operating an oral hygiene device including at least one motion sensor is provided. In one embodiment, an initial orientation of an inter-oral assembly of the oral hygiene device is determined in response to the inter-oral assembly being moved to a first location within a mouth of the individual based on motion sensing data obtained from the at least one motion sensor. A first indication is provided for moving the inter-oral assembly to a first segment within the mouth. In response to the inter-oral assembly being moved to the first segment, a determination is made that the inter-oral assembly is located within a first sub-segment of the mouth, where the first segment includes at least the first sub-segment. A first level of compliance within the first segment is then determined based on cleaning by the inter-oral assembly within the first sub-segment. Feedback is then provided based on the cleaning within the first sub-segment. In response to the first level of compliance being greater than a pre-set compliance level for the first segment, a second indication is provided for moving the inter-oral assembly to a second segment within the mouth.

BRIEF DESCRIPTION OF THE DRAWINGS

The above and other features of the present invention, its nature and various advantages will be more apparent upon consideration of the following detailed description, taken in conjunction with the accompanying drawings in which:

FIGS. 5A and 5B are illustrative diagrams of a mouths 500 and 550, respectively, divided into various segments in accordance with various embodiments;

DETAILED DESCRIPTION OF EXEMPLARY EMBODIMENTS

The present invention may take form in various components and arrangements of components, and in various techniques, methods, or procedures and arrangements of steps. The referenced drawings are only for the purpose of illustrated embodiments, and are not to be construed as limiting the present invention. Various inventive features are described below that can each be used independently of one another or in combination with other features. Furthermore, as used herein, the singular form of "a", "an", and "the" include plural references unless the context clearly dictates otherwise.

Figure 1A:
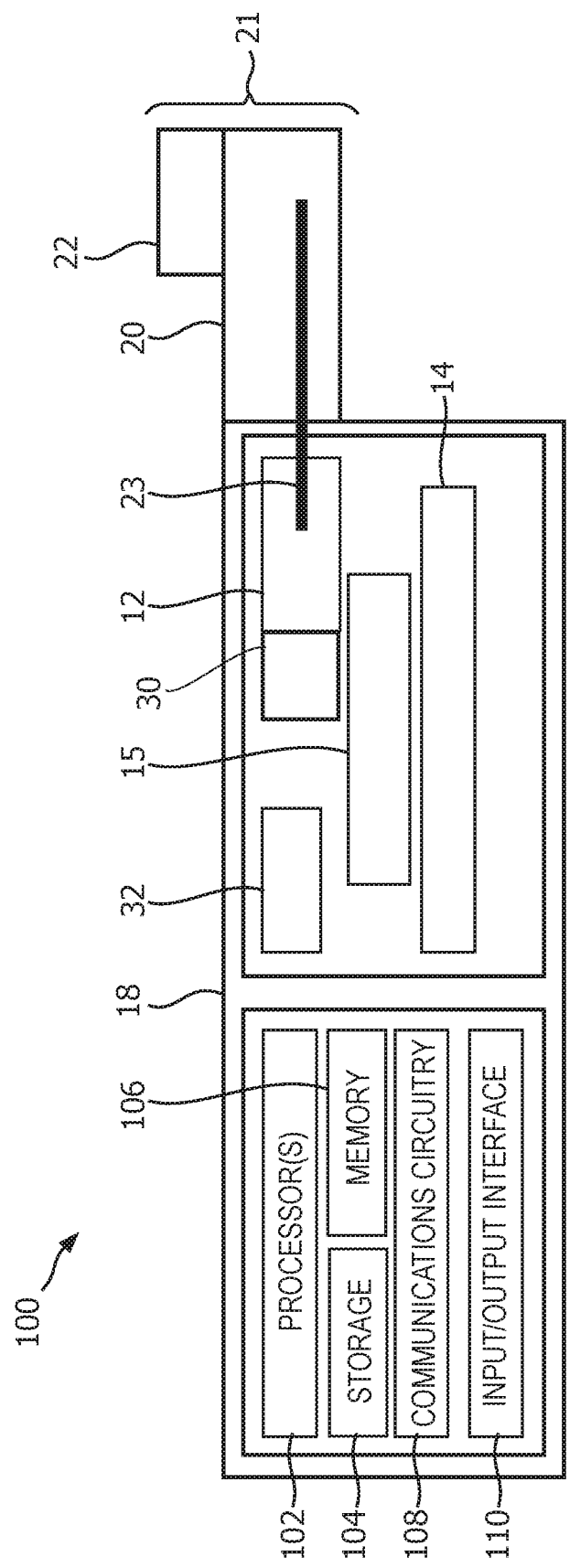
FIG. 1A is an illustrative diagram of an oral hygiene device 100 including at least one motion sensor in accordance with various embodiments.

FIG. 1A is an illustrative diagram of an oral hygiene device 100 including at least one motion sensor in accordance with various embodiments. Oral hygiene device 100 includes a drive train assembly 12 resonantly driven by a power system 14 which includes a battery and an electronics carrier (e.g., a printed circuit board or PCB). Oral hygiene device 100 also includes a housing 18, or handle. Oral hygiene device 100 further includes a printed circuit board with a microprocessor control 15 for creating a drive signal for power system 14. Removably secured to a drive stem 23 from the drive train assembly 12 is an inter-oral assembly 20, which, in one exemplary embodiment, is referred to as a brush head. At a distal end of inter-oral assembly 20 is a brush member 21, with a bristle field 22. Mounted within the oral hygiene device is a magnet 30, and at least one sensor 32, which is positioned, in one embodiment, adjacent to magnet 30.

In one exemplary embodiment, sensor 32 is a Hall Effect sensor. In one embodiment, sensor 32 is a Hall Effect sensor capable of measuring a strength of a magnetic field generated by magnet 30 within housing 18 relative to the Hall Effect sensor. When an external load, or force, is applied to inter-oral assembly 20, a deformation of the magnetic field within housing 18 occurs. This deformation is measured via sensor(s) 32, and may provide information regarding an amount of force applied to inter-oral assembly 20.

In one embodiment, sensor 32 is a force sensor. The force sensor may be included in place of the Hall Effect sensor and/or in addition to the Hall Effect sensor. The force sensor allows for information corresponding to an amount of force that is being applied to inter-oral assembly 20. In one embodiment, however, the amount of force applied to inter-oral assembly 20 may also be extracted from a Hall Effect sensor. For example, the force applied to inter-oral assembly 20 may be obtained, in one embodiment, using the Lorentz Force law.

In one embodiment, sensor(s) 32 corresponds to one or more motion sensors, such as accelerometers, capable of determining how quickly (e.g., a velocity and/or an acceleration) oral hygiene device 100, and in particular inter-oral assembly 20, is moving. In one embodiment, the motion sensors are operable to measure changes in the motion of oral hygiene device 100 by determining a change in an orientation of oral hygiene device 100 with respect to gravity. In one embodiment, an additional pre-processing step is performed to remove any effects of gravity from the motion sensor's signal. For example, the motion sensor's signal may have added noise due to gravitational effects detected by the motion sensor. By applying pre-processing, such as a low or high-pass filter, this noise may be removed such that accurate analysis of motion sensing data of oral hygiene device 100 occurs. In another embodiment, sensor(s) 32 also correspond to any suitable sensing device or system that obtains and/or monitors a position or orientation of oral hygiene device 100 and/or a head of an individual whose mouth is to be cleaned using oral hygiene device 100. Various other types of sensor(s) 32 include, but are not limited to, cameras, capacitive sensors, or any other type of sensor, or any combination thereof.

Oral hygiene device 100, in the illustrated non-limiting embodiment, includes a processor or processors 102, storage 104, memory 106, communications circuitry 108, and an input/output interface 110. Processor 102 may include any processing circuitry, such as one or more processors capable of controlling the operations and functionality of oral hygiene device 100. In one embodiments, processor(s) 102 facilitates communications between various components within oral hygiene device 100 (e.g., sensor(s) 32 and communications circuitry 108).

Storage 104 and memory 106, in one embodiment, each correspond to one or more storage mediums. Various types of storage mediums include, but are not limited to, hard-drives, solid state drives, flash memory, permanent memory (e.g., ROM), or any other storage type, or any combination thereof. Any form of data or content may be stored within storage 104 and/or memory 106 such as photographs, music files, videos, contact information, applications, documents, or any other file, or any combination thereof. Memory 106 also, in one embodiment, includes cache memory, semi-permanent memory (e.g., RAM), or any other memory type, or any combination thereof. In one embodiments, memory 106 is used in place of and/or in addition to external storage for storing data on oral hygiene device 100. In yet another embodiment, storage 104 and memory 106 are combinable into a single storage/memory unit.

Communications circuitry 108, in one embodiment, includes any circuitry capable of connecting to a communications network and/or transmitting communications (voice and/or data) to one or more additional user devices and/or servers. Communications circuitry 108 is capable of interfacing with the communications network using any suitable communications protocol including, but not limited to, Wi-Fi (e.g., 802.11 protocol), Bluetooth®, radio frequency systems (e.g., 900 MHz, 1.4 GHz, and 5.6 GHz communications systems), infrared, GSM, GSM plus EDGE, CDMA, quadband, VOIP, or any other protocol, or any combination thereof.

Input/output interface 110, in one embodiment, includes any suitable mechanism or component for receiving inputs from a user operating oral hygiene device 100 and/or generating outputs from a user operating oral hygiene device 100. Input/output interface 110 may include, but is not limited to, an external keyboard, mouse, joystick, or any other suitable input mechanism, or any combination thereof. In one embodiment, input/output interface 110 includes a display capable of displaying a user interface thereon.

Oral hygiene device 100 is operable to acquire motion sensing data from sensor 32 or any other sensor(s) resident therein, and analyze the motion sensing data to determine a cleaning performance of the individual operating oral hygiene device 100. In one embodiment, the analyzed motion sensing data is used to provide feedback to the individual operating oral hygiene device 100 via input/output interface 110. For example, input/output interface 110 may include a display screen operable display a user interface including analysis of the individual's oral hygiene cleaning performance. As another example, input/output interface 110 may provide audio, visual, or haptic feedback to the user based on the analyzed motion sensing data acquired by sensor(s) 32. Persons of ordinary skill in the art will also recognize that although sensor 32 is used to acquire motion sensing data, one or more additional sensors, such as an additional Hall Effect sensor, Force sensor, and or IMU, may also be used.

Figure 1B:
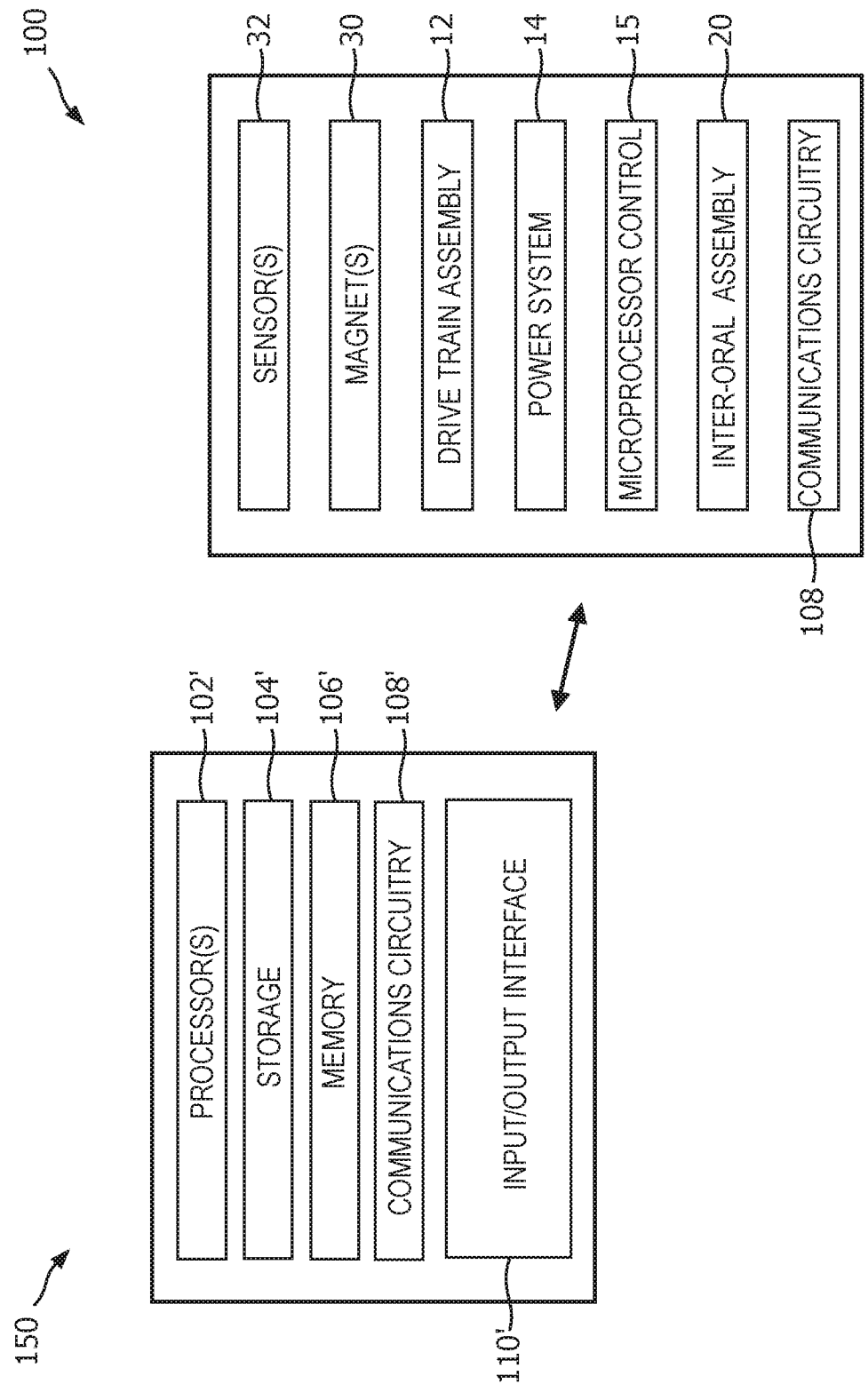
FIG. 1B is an illustrative diagram of oral hygiene device 100 in communication with a user device 150 in accordance with various embodiments.

FIG. 1B is an illustrative diagram of oral hygiene device 100 and user device 150 in accordance with various embodiments. In the illustrated exemplary embodiment, user device 150 includes processor(s) 102', storage 104', memory 106', communications circuitry 108', and input/output interface 110'. Oral hygiene device 100, in the illustrated exemplary embodiment, is substantially similar to oral hygiene device 100 of FIG. 1A, and the previous description applies. User device 150, in one exemplary embodiment, corresponds to a smartphone, mobile device, tablet, or any other suitable user device, or any combination thereof. As another exemplary embodiment, user device 150 corresponds to a base station for an electronic toothbrush (e.g., oral hygiene device 100), an electronic shaver, an electronic tongue cleaning device, and/or an electronic flossing device, or any other electronic personal hygiene device, or any combination thereof. Furthermore, in one exemplary embodiment, oral hygiene device 100 corresponds to a device that analyzes tooth decay levels, and provides feedback to individuals operating oral hygiene device 100 as to the level of tooth decay within their mouth.

Communications circuitry 108' of user device 150, in one embodiment, enables motion sensing data acquired by sensor(s) 32 to be transmitted from oral hygiene device 100 to user device 150 via communications circuitry 108, 108'. For example, data from sensor(s) 32 of oral hygiene device 100 may be transmitted to user device 150 via a Wi-Fi connection, a Bluetooth connection, and/or a hardwire connection. Although each of oral hygiene device 100 and user device 150 include instances of communications circuitry 108, 108', persons of ordinary skill in the art will recognize that both instances need not correspond to a same instance of communications circuitry.

Data acquired by sensor(s) 32 of oral hygiene device 100, in one embodiment, corresponds to detected deformations of a magnetic field formed within housing 18 of oral hygiene device 100 based activity of a user operating oral hygiene device 100. For example, when an external force or load is applied to inter-oral assembly 20, a deformation may occur to the magnetic field within housing 18 that is measurable by sensor(s) 32. The data is capable of being sent from oral hygiene device 100 to user device 150 for processing, analysis, and/or providing feedback to the user operating oral hygiene device 100. For example, data acquired by sensor(s) 32, such as a Hall Effect sensor, may be analyzed on user device 150 using one or more algorithms stored within memory 106', which determine an oral hygiene cleaning performance of the user. Feedback is then capable of being provided to the user regarding their determined oral hygiene cleaning performance.

In one embodiment, the feedback is displayed on a display screen (e.g., a display screen within I/O interface 110, 110') presenting a user interface thereon. In one embodiment, input interface 110, 110' includes a camera, which may corresponds to any image capturing component capable of capturing images and/or videos. For example, the camera may capture photographs, sequences of photographs, rapid shots, videos, 3D images/videos, or any other image type, or any combination thereof. In one embodiment, user device 150 includes multiple cameras. For example, user device 150 may include a front-facing camera and a rear facing camera. In yet another embodiment, the camera of user device 150 is waterproof or substantially waterproof.

Persons of ordinary skill in the art will recognize that oral hygiene device 100 may refer to any product able to attend to an individual's oral hygiene, including, but not limited, electronic toothbrushes, non-electronic toothbrushes, floss devices, water picks, water jets, tongue cleaners, or any other oral hygiene device, or any combination thereof. Furthermore, in at least one embodiment, oral hygiene device 100 may refer to a personal hygiene device, such as an electronic shaver, hair trimmer, personal groomer, etc., and the foregoing illustrations are not limited to just oral hygiene scenarios.

Figure 2:
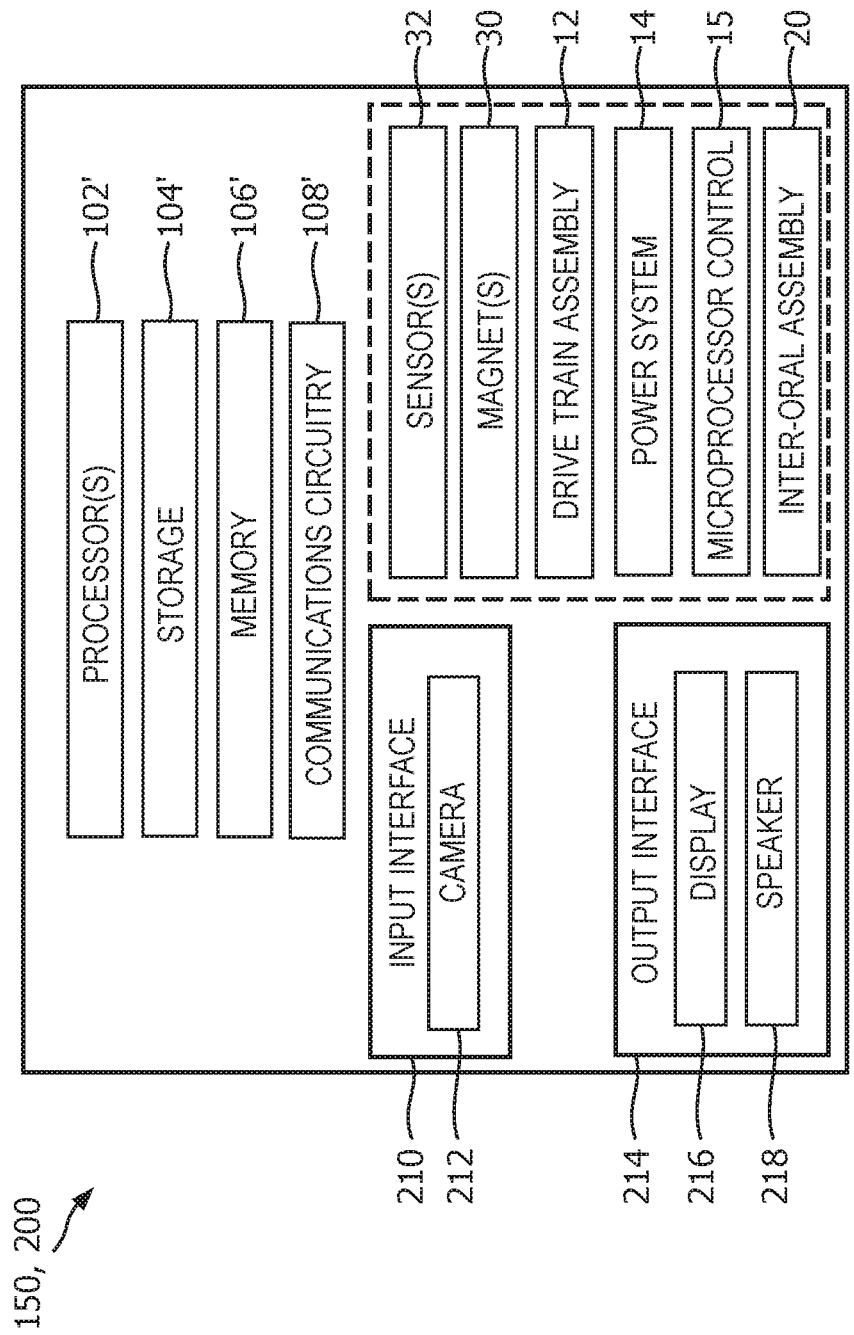
FIG. 2 is an illustrative diagram of another user device 150, 200 in accordance with various embodiments.

FIG. 2 is an illustrative diagram of user device 150, 200 in accordance with various embodiments. User device 150, 200, in the illustrative exemplary embodiment, includes processor(s) 102', storage 104', memory 106', communications circuitry 108', input interface 210, and output interface 214. Input interface 210, in one embodiment, includes any suitable mechanism or component for receiving inputs from a user operating user device 150, 200. In one embodiment, input interface 210 includes a camera 212. Camera 212, in one exemplary embodiment, corresponds to any image capturing component capable of capturing images and/or videos. For example, camera 212 may capture photographs, sequences of photographs, rapid shots, videos, 3D images/videos, or any other image type, or any combination thereof. In one embodiment, user device 150, 200 includes multiple instances of camera 212. In yet another embodiment, camera 212 is waterproof or substantially waterproof.

Output interface 214 includes any suitable mechanism or component for generating outputs from a user operating user device 150, 200. Output interface, in the illustrative embodiment, includes a display 216 and a speaker 218. Display 216, in one embodiment, corresponds to any type of display capable of presenting content to a user and/or on user device 150, 200. Display 216 is capable of being any size and located on one or more regions/sides of user device 150, 200. For example, display 216 may fully occupy a first side of user device 150, 200, or may occupy only a portion of the first side. Various display types include, but are not limited to, liquid crystal displays ("LCD"), monochrome displays, color graphics adapter ("CGA") displays, enhanced graphics adapter ("EGA") displays, variable graphics array ("VGA") displays, or any other display type, or any combination thereof. In one embodiment, display 216 is a touch screen and/or an interactive display. In another embodiment, the touch screen includes a multi-touch panel coupled to processor(s) 102 of user device 150, 200. In still another embodiment, display 216 is a touch screen including capacitive sensing panels.

Speaker 218, in one embodiment, corresponds to any suitable mechanism for outputting audio signals. For example, speaker 218 may include one or more speaker units, transducers, or array of speakers and/or transducers capable of broadcasting audio signals and audio content to a user interfacing with user device 150, 200. In one embodiment, speaker 218 corresponds to headphones or ear buds capable of broadcasting audio directly to a user operating user device 150, 200.

In one exemplary embodiment, user device 150, 200 includes one or more components of oral hygiene device 100 of FIG. 1A. For example, user device 150, 200 may correspond to an electronic toothbrush. As another example, user device 150, 200 includes sensor(s) 32, magnet(s) 30, drive train assembly 12, power system 14, microprocessor control 15, and inter-oral assembly 20. Persons of ordinary skill in the art will recognize that although user device 150, 200 includes one or more features of oral hygiene device 100, any number of additional components may be added, or any number of components may be removed, and the aforementioned description is merely exemplary. Furthermore, user device 150, 200, in one embodiment, is substantially similar to oral hygiene device 100 of FIG. 1A with the exception that the former includes one or more of cameras 212, display 216, and/or speaker 218.

In one embodiment, camera 212 may be external such that it protrudes from housing 18 to capture images of inter-oral assembly 20 while interacting with an individual's teeth. In another embodiment, camera 212 is embedded in inter-oral assembly 20. In this particular scenario, camera 212 may include one or more lights (e.g., LEDs, infrared) to illuminate a portion of the individual's mouth that will be interacted with. Various landmarks within the mouth may then be used as a reference point to determine motion and/or quality of oral hygiene cleaning activity. For example, a user's tongue, palate, and/or palatine uvula may be used as a "landmark" to determine where in the user's mouth user device 150, 200 is located. Motion is capable of being determined, in one embodiment, based on changes in captured images between one image and a subsequent image based on differences between the two images, such as differences in position of a tooth or teeth with respect to the physical landmark.

Figure 3:
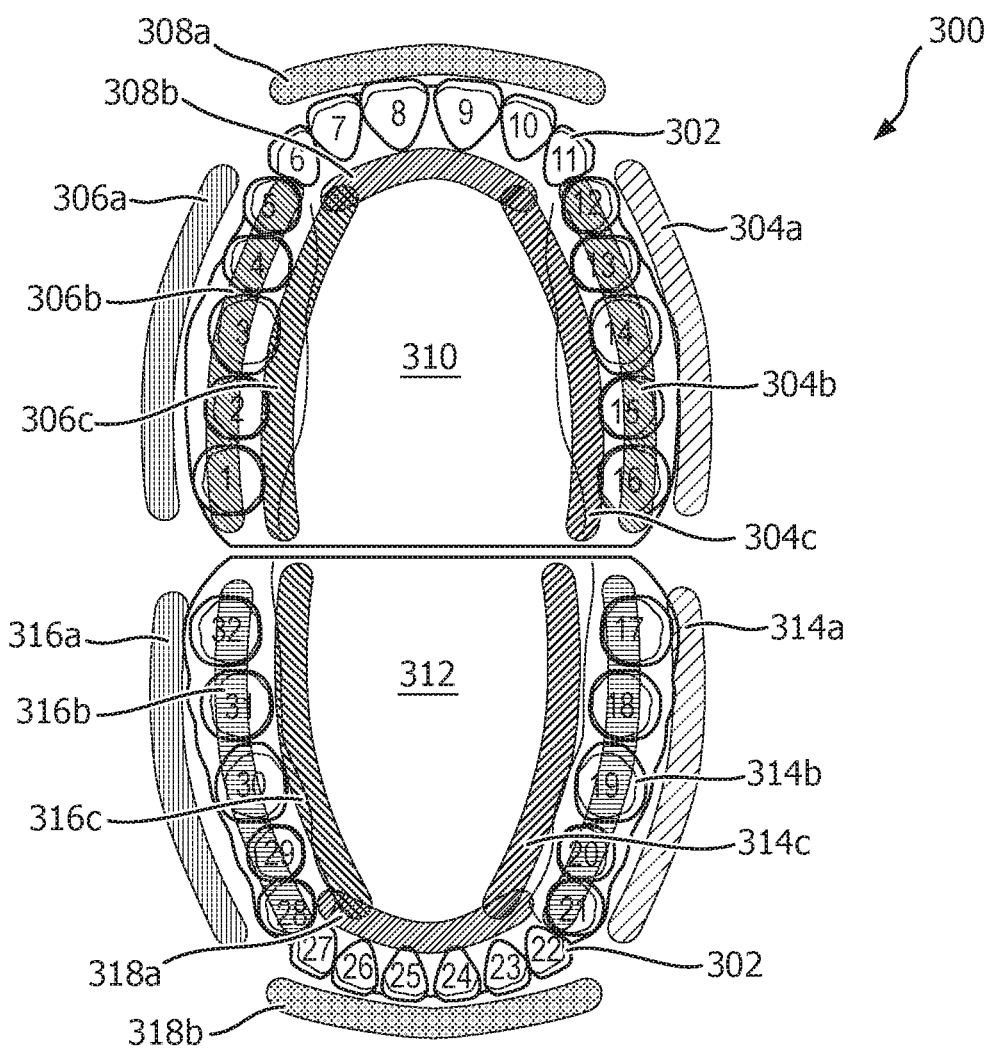
FIG. 3 is an illustrative diagram of a mouth 300 divided into various sub-segments in accordance with various embodiments.

FIG. 3 is an illustrative diagram of an individual's mouth 300 divided into various sub-segments in accordance with various embodiments. In the illustrative, non-limiting embodiment, mouth 300 is divided into sixteen sub-segments. The sixteen sub-segments are split between an upper portion 310 of mouth 300 and a lower portion 312 of mouth 300. For instance, upper portion 310 of mouth 300 includes sub-segments 304a-c, 306a-c, and 308a and 308b, while lower portion 312 of mouth 300 includes sub-segments 314a-c, 316a-c, and 318a and 318b. Persons of ordinary skill in the art will recognize that other divisions of mouth 300 are possible, and the aforementioned is merely exemplary. Each of upper portion 310 and lower portion 312 includes multiple instances of a tooth 302. For example, each of upper portion 310 and lower portion 312 include sixteen (16) teeth 302. However, one or more additional or fewer teeth 302 may be present within each of upper portion 310 and lower portion 312.

As an illustrative example, sub-segment 304a may correspond to an outer surface of teeth located in a segment of upper portion 310 of mouth 300. Sub-segment 304c, in turn, corresponds to an inner surface of teeth located in that segment, while sub-segment 304b corresponds to a chewing surface of teeth in that segment. Similar labeling may also be applied to sub-segments 306a-c, 314a-c, and 316a-c.

Sub-segment 308a and 308b, in one embodiment, correspond to an exterior and an interior surface of another segment of upper portion 310 of mouth 300. For example, sub-segment 308a may correspond to an exterior surface of an individual's upper front teeth, while sub-segment 308b may correspond to an interior surface of an individual's upper front teeth. Similarly, sub-segments 318a and 318b, in one embodiment, correspond to an exterior and an interior surface of another segment of lower portion 312 of mouth 300. Persons of ordinary skill in the art will recognize that a chewing surface of the front upper and lower segments may, in other embodiments, also be included as an additional or separate sub-segment.

Figure 4:
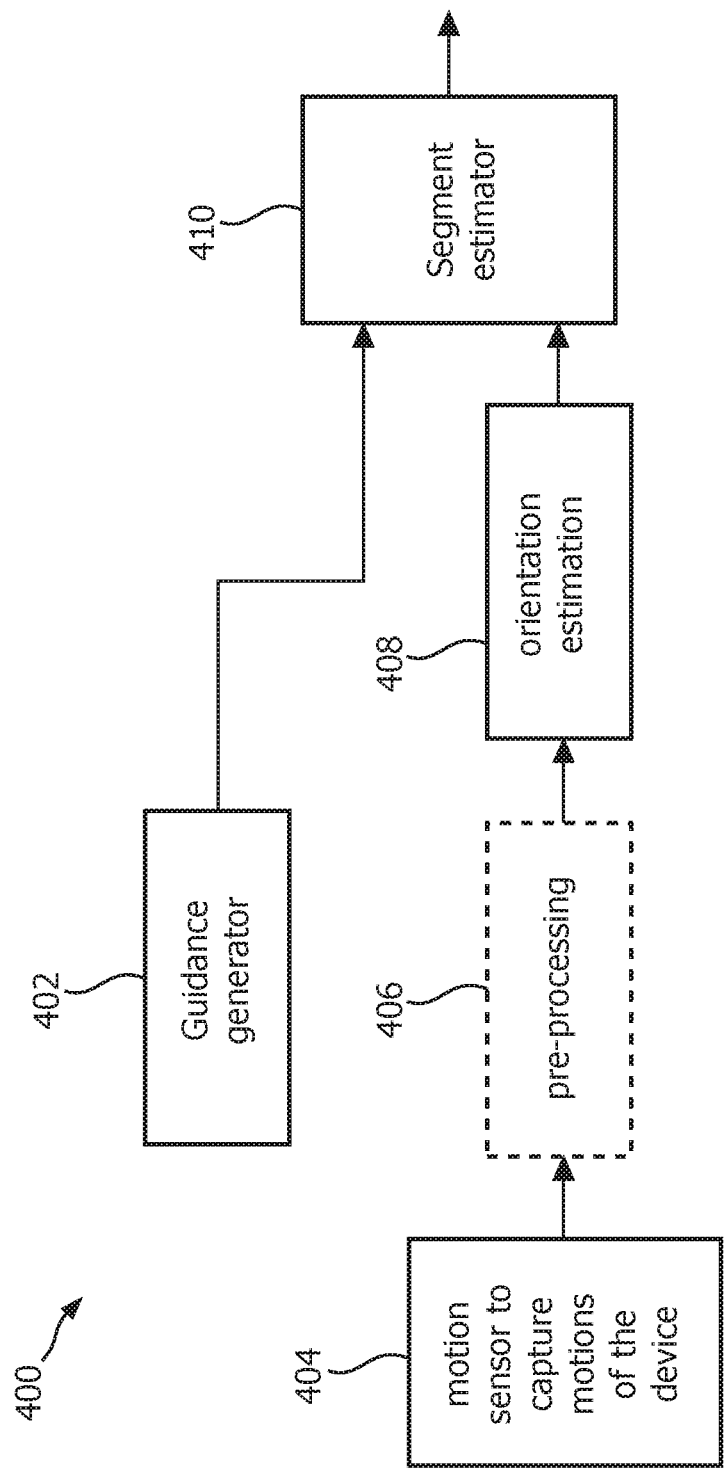
FIG. 4 is an illustrative block diagram of a system 400 for estimating a segment within mouth 300 where a brush head is located, in accordance with various embodiments.

FIG. 4 is an illustrative block diagram of system 400 for estimating a segment within mouth 300 where inter-oral assembly 20 is located, in accordance with various embodiments. System 400 includes a first block 402, where oral hygiene cleaning guidance for an individual operating oral hygiene device 100 and/or user device 150, 200 is generated. The guidance generator of block 402 generates location guidance for the user. In one embodiment, the guidance is time based. For example, the guidance generator may set a time period that the individual should spending cleaning a particular segment (described in greater detail below with reference to FIGS. 5A and 5B) or sub-segment (described in greater detail above with reference to FIG. 3) within mouth 300, and after that time period has expired, the guidance generator instructs the individual to move inter-oral assembly 20 of oral hygiene device 100 and/or user device 150, 200 to a different location (e.g., different segment or sub-segment) within mouth 300. In another embodiment, the generated guidance takes into account other metrics or analysis of the individual's oral hygiene cleaning behavior. For example, the guidance generator may take into account an amount of force applied to a particular segment or sub-segment within the individual's mouth, and, if the force is greater than a certain threshold, the guidance generator instructs the individual to move inter-oral assembly 20 of oral hygiene device 100 and/or user device 150, 200 to a different location (e.g., different segment or sub-segment) within their mouth. In yet another embodiment, the guidance is based on a mode, intensity setting, and/or type of inter-oral assembly 20.

In one exemplary embodiment, the guidance generator provides guidance to the individual based on the individual's oral hygiene cleaning history. For example, oral hygiene device 100 and/or user device 150,200 may store an oral hygiene cleaning performance corresponding to each segment/sub-segment within mouth 300. If, during a particular cleaning session, the individual does not clean a certain segment/sub-segment correctly (e.g., too much or too little force, not all the surfaces of that region, or for too short a period of time), the guidance generator of block 402 may provide an instruction to the individual to clean that segment/sub-segment in a different manner. As an illustrative example, if during a previous oral hygiene cleaning session an individual forgets to clean sub-segment 304a, the guidance generator of block 402 may instruct the individual to spend an additional amount of time on sub-segment 304*a* (or within the segment that includes sub-segment 304*a*) during the subsequent oral hygiene cleaning session.

System 400 also includes block 404, in the illustrative embodiment, where one or more motion sensors that are configured to capture motion sensing data of oral hygiene device 100 and/or user device 150, 200. For example, sensor(s) 32 of oral hygiene device 100 may correspond to one or more motion sensors or Hall Effect sensors. In the former case, the motion sensor(s) captures motion sensing data corresponding to oral hygiene device 100 and/or user device 150, 200. In an illustrative embodiment, oral hygiene device 100 and/or user device 150, 200 includes one or more inertial measurement units ("IMUs") coupled to oral hygiene device 100 and/or user device 150, 200, which include one or more multi-axis gyro sensors, accelerometer (e.g., single axis accelerometers or multi-axes accelerometers), and/or one or more magnetometer sensors.

At block 406, system 400 is configurable to perform pre-processing to the motion data captured from the motion sensors described at block 404. The pre-processing is formatted such that the impact of motor driving signals from the drive system of oral hygiene device 100 and/or user device 150, 200 on the motion sensors is reduced. In one exemplary embodiment, this is performed by a low-pass and/or a high-pass filter, or any other frequency range filter. In another embodiment, down-sampling is alternatively, or additionally, performed to reduce the amount of communication bandwidth and computational load of signal processing components. In one embodiment, block 406 of system 400 is optional, such that oral hygiene device 100 and/or user device 150, 200 is configured to be able to perform, or not perform pre-processing on the motion data. For example, the motion data captured by the one or more motion sensors of oral hygiene device 100 may not have any pre-processing performed to them, and block 406 may be skipped altogether.

At block 408, system 400 performs an orientation estimation of inter-oral assembly 20 of oral hygiene device 100 and/or user device 150, 200 within mouth 300. In one exemplary embodiment, sensors 32 correspond to one or more accelerometers, and based on an initial position for inter-oral assembly 20, a determination is made as to where inter-oral assembly 20 is located within mouth 300. For example, oral hygiene device 100 may be initially oriented by being placed in a certain spot within mouth 300, such as the upper right portion. After the initialization has occurred, the individual may be free to move inter-oral assembly 20 of oral hygiene device 100 and/or user device 150, 200 to different locations within mouth 300. The one or more accelerometers located within oral hygiene device 100 and/or user device 150, 200 then track an amount of movement (e.g., motion sensing data) of inter-oral assembly 20 and determine where inter-oral assembly 20 is within mouth 300 as the movements occur.

At block 410, system 400 includes a segment estimator that estimates which segment or sub-segment (see FIGS. 5A and 5B) within mouth 300 that inter-oral assembly 20 is currently located within. The segment estimator, in one embodiment, uses coarse location guidance obtained from the guidance generator of block 402, as well as coarse location estimation from the orientation estimator of block 408, to determine a location within mouth 300 of inter-oral assembly 20. The segment, as described herein, typically refers to a grouping of teeth 302 (e.g., back upper right molars, front lower teeth). Persons of ordinary skill in the art will recognize that the guidance generator of block 402 and the motion sensor capturing, pre-processing, and orientation estimator of blocks 404, 406, and 408, respectively, may work in parallel with one another or serially. For example, the guidance generator of block 402 may provide guidance information at a substantially same time as an orientation estimation is provided from block 408.

FIGS. 5A and 5B are illustrative diagrams of individual's mouth 500 and 550, respectively, divided into various segments in accordance with various embodiments. Mouth 500 of FIG. 5A, in the illustrative embodiment, depicts various guidance patterns for an individual operating oral hygiene device 100 and/or user device 150, 200. Guidance is capable of being given, in the exemplary embodiment, on six (6) segments. For example, mouth 500 is divided into upper portion 310 and lower portion 312. Upper portion 310 includes first segment 502, corresponding to the upper front teeth, while second and third segments 504 and 506 correspond to the upper right teeth and upper left teeth, respectively. Lower portion 312 includes fourth segment 512, corresponding to the lower front teeth, while fifth and sixth segments 514 and 516 correspond to the lower right teeth and the lower left teeth, respectively. Persons of ordinary skill in the art will recognize that the direction assignments of each segment are merely exemplary, and the designations of upper, lower, right, left, and front are purely illustrative. A user operating oral hygiene device 100 and/or user device 150, 200 may be given guidance to clean one or more teeth 302 located within a certain segment. In response to moving inter-oral assembly 20 of oral hygiene device 100 and/or user device 150, 200 to a certain segment, a sub-segment that inter-oral assembly 20 is in contact with, or located within, is determined.

Mouth 550 of FIG. 5B, in the illustrative embodiment, depicts an alternative guidance patterns for an individual operating oral hygiene device 100 and/or user device 150, 200. In this particular embodiment, guidance is capable of being given on four (4) segments. For example, mouth 550 is again divided into upper portion 310 and lower portion 312. However, in this exemplary embodiment, upper portion 310 includes two (2) segments 552 and 554. Segment 552 and 554 include an equal yet opposite portion of teeth 302 within upper portion 310. For example, first segment 552 may include a majority of the upper right portion of teeth 302, half of the upper front teeth 302, and a small portion of the upper left teeth 302, while second segment 554 may include a majority of the upper left portion of the teeth 302, half of the upper front teeth 302, and a minor portion of the upper right teeth 302. In this manner, each of segments 552 and 554 cover some section of each region of teeth 302 included within upper portion 310 of mouth 550. Similarly, lower portion 312 includes segments 556 and 558, which each include an equal amount of teeth 302 within lower portion 312, and evenly split the surface areas of teeth 302 within lower portion 312 between each of segments 556 and 558.

Figure 6:
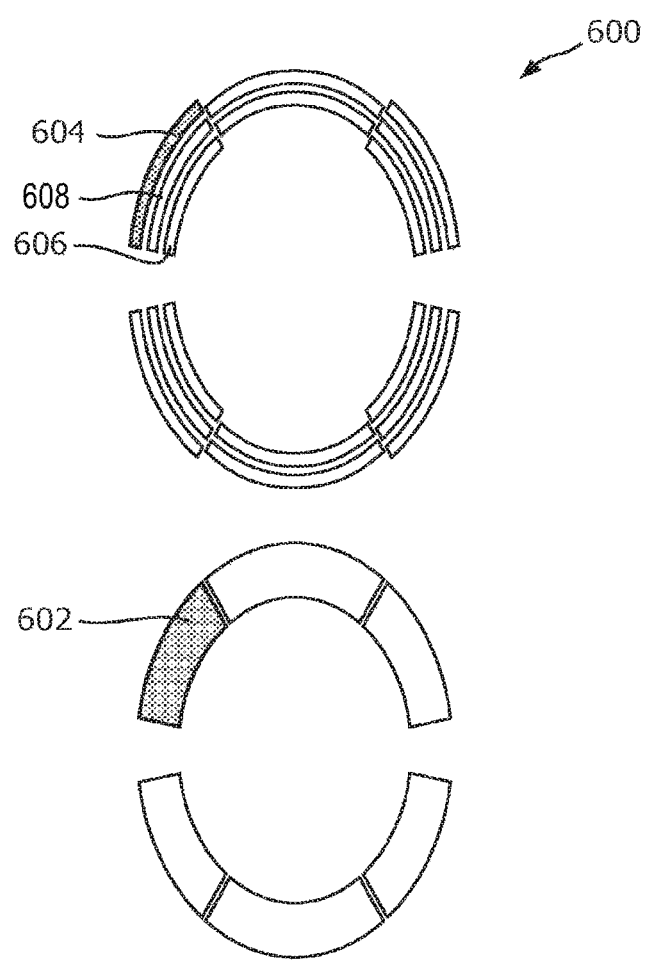
FIG. 6 is an illustrative diagram of a representation 600 of a segment that a brush head is located within, and a corresponding sub-segment of the segment that the brush head is located within, in accordance with various embodiments.

FIG. 6 is an illustrative diagram of digital representation 600 of a segmented mouth for showing location of the inter-oral assembly in accordance with various embodiments. Representation 600, in the illustrative non-limiting embodiment, includes six segments for which an individual may be provided guidance. For example, as described previously with regards to FIG. 5A, mouth may be divided into six segments—three for upper portion and three for lower portion. Representation 600, as shown, includes sixteen sub-segments for which the individual operating the device may be provided feedback, eight for the upper portion of the mouth, and eight for the lower portion of the mouth.

A user is given guidance (e.g., an instruction) to move inter-oral assembly 20 to a certain segment within their mouth. As an illustrative example, the user may be provided guidance to move inter-oral assembly 20 to segment 602. After inter-oral assembly 20 is moved to segment 602, the one or more motion sensors located on oral hygiene device 100 and/or user device 150, 200 may capture motion sensing data to determine which sub-segment within segment 602 that inter-oral assembly 20 is currently located. For example, within segment 602 may be sub-segments 604, 606, and 608. Using the one or more motions sensors located on oral hygiene device 100 and/or user device 150, 200, a determination is made as to which sub-segment (e.g., sub-segments 604, 606, and 608) that inter-oral assembly 20 is located. In the illustrated example, inter-oral assembly 20 of oral hygiene device 100 and/or user device 200 is located within sub-segment 604.

In one embodiment, a level of compliance of the individual operating oral hygiene device 100 and/or user device 150, 200 is determined. The level of compliance is checked by measuring the motion sensing data obtained by the motion sensors located on oral hygiene device 100 and/or user device 150, 200, and comparing that motion sensing data against expected behavior (e.g., motion) of oral hygiene device 100 and/or user device 150, 200 within that segment or sub-segment. In one embodiment, the compliance level for the oral hygiene cleaning performance of the individual within a particular segment (or sub-segment) where inter-oral assembly 20 of oral hygiene device 100 and/or user device 150, 200 is located is therefore determined, and the compliance level is compared with a pre-set compliance level for that segment (or sub-segment) to determine whether the user has properly cleaned that segment (or sub-segment) of their mouth.

As an illustrative example, an individual is provided guidance to clean one or more teeth 302 located within first segment 602. After determining that inter-oral assembly 20 of oral hygiene device 100 and/or user device 150, 200 is located within segment 602, motion sensing data from sensor(s) 32 of oral hygiene device (e.g., one or more accelerometers or IMUs) is analyzed to determine which sub-segment within segment 602 that inter-oral assembly 20 is located. For example, motion sensing data for oral hygiene device 100 and/or user device 150, 200 may indicate that inter-oral assembly 20 is located within sub-segment 604 within first segment 602. The motion sensing data may be analyzed to determine whether the user has applied enough force to that segment to properly clean teeth 302 located within sub-segment 604, and may also check to ensure that the user has cleaned the one or more teeth 302 located within sub-segment 604 for a suitable amount of time. If so, a determination is made as to whether or not all of the sub-segments (e.g., segments 606 and 608) within segment 602 have been cleaned. If not, the user may be instructed to continue cleaning, or modify their cleaning technique within that segment to properly clean, the one or more teeth located within that particular sub-segment.

If the individual has not cleaned each sub-segment within a particular segment, or has not performed correct oral hygiene cleaning practices for each sub-segment (e.g., brushing too hard or too soft, not brushing for a long enough period of time), the compliance level for that segment, when compared with the pre-set compliance level for that segment, will be determined to be lower than needed to signify that proper cleaning of that segment occurred. In response, the individual may be guided to modify their oral hygiene cleaning technique, or continue cleaning that segment for a longer period of time, to ensure that the entire segment (e.g., each sub-segment therein) has been properly cleaned. Thus, after all sub-segments (e.g., sub-segments 604, 606, and 608) within that segment (e.g., segment 602) have been determined to be cleaned correctly, the compliance level that is calculated, when compared with that segment's pre-set compliance level, will be determined to be greater, and the user is instructed to move to a new segment or to stop cleaning all together (e.g., if all segments have been addressed).

In an exemplary embodiment, each segment within mouth 500 has an equal pre-set compliance level (e.g., greater than 75%, greater than 90%, etc.), however different segments may have different compliance levels. As long as the compliance level that is calculated for a particular segment is greater than that segment's pre-set compliance level, the individual will, therefore, be guided to a new segment within their mouth for cleaning. In one embodiment, the pre-set compliance level for each segment is programmed by an individual operating oral hygiene device 100 and/or user device 150, 200. In another embodiment, the pre-set compliance level for each segment is programmed by a manufacturer of oral hygiene device 100 and/or user device 150, 200, or by an oral healthcare professional for the user of oral hygiene device 100 and/or user device 150, 200.

Figure 7:
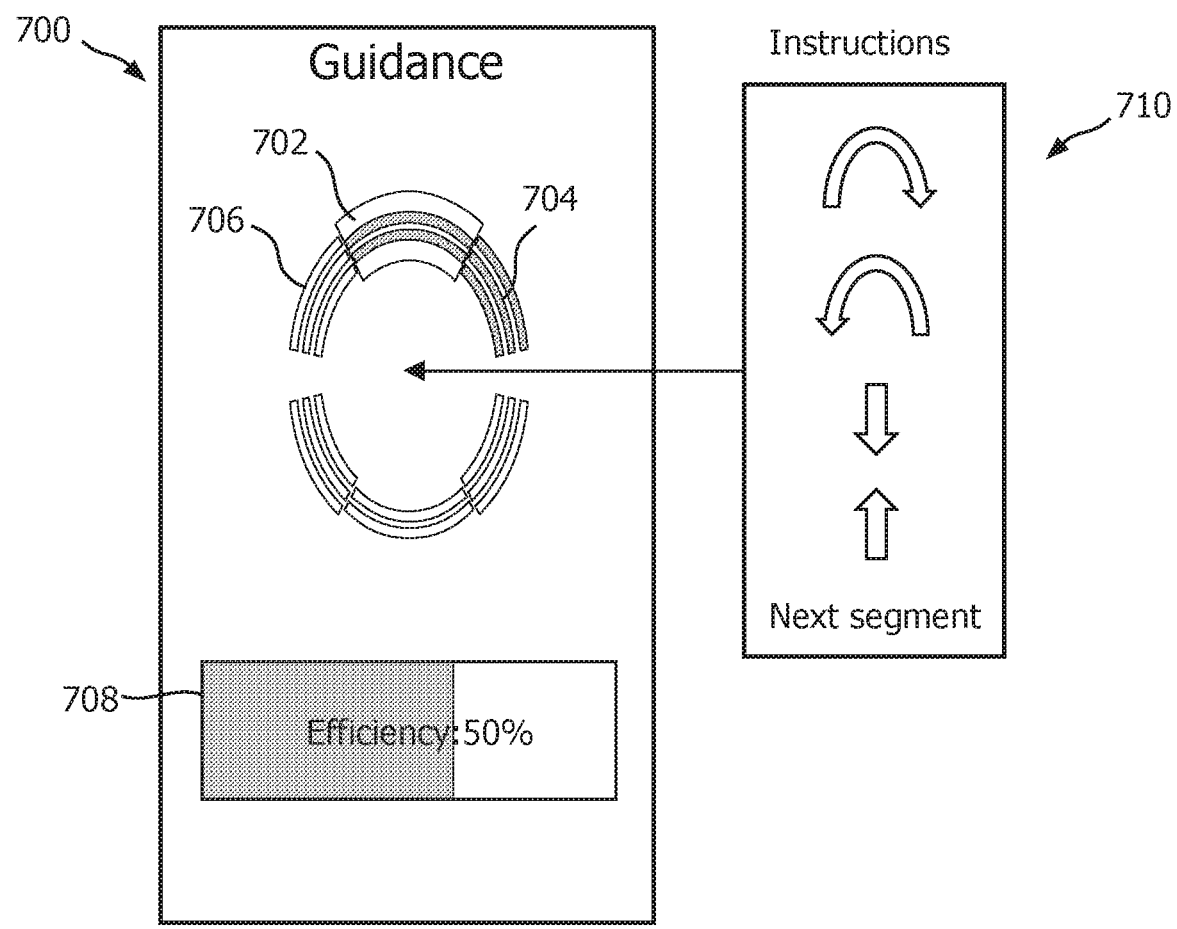
FIG. 7 is an illustrative diagram of a user interface 700 displayed on a display screen for providing guidance and brushing performance information, in accordance with various embodiments.

FIG. 7 is an illustrative diagram of a user interface 700 displayed on a display screen for providing guidance and oral hygiene cleaning performance information to an individual, in accordance with various embodiments. User interface 700 is an exemplary, non-limiting illustration of a user interface displayed on a display screen (e.g., display 216) of a user device (e.g., user device 150, 200) and/or on an individual's oral hygiene device (e.g., oral hygiene device 100), showing how effective an individual's oral hygiene cleaning performance is for a current cleaning session. Also included within user interface 700 is a user's cleaning efficiency for a particular location within their mouth. The cleaning efficiency is represented, in the illustrative embodiment, by a cleaning efficiency meter 708, which details the individual's particular cleaning efficiency for a particular region (e.g., an instantaneous location of inter-oral assembly 20 of oral hygiene device 100 and/or user device 200), or a cumulative cleaning efficiency for each region within the individual's mouth that has been cleaned already, or an overall cleaning efficiency of the user's entire mouth. The cleaning efficiency is capable of being calculated based on a specific setting of oral hygiene device 100 and/or user device 150, 200, or based on previous cleaning sessions, thereby leveraging past oral hygiene cleaning performance to determine an effectiveness of current oral hygiene cleaning performance.

An individual's oral hygiene cleaning efficiency is, in one embodiment, calculated based on a total time spent within a specific segment/sub-segment, and an amount of force applied to a tooth or teeth 302 within a corresponding segment/sub-segment. If inter-oral assembly 20 spends a correct amount of time, which may be pre-set or pre-defined, within a certain segment/sub-segment, oral hygiene device 100 and/or user device 150, 200 registers a logical true, signifying that a correct amount of time has been spent cleaning that segment/sub-segment. If inter-oral assembly 20 does not spend the correct amount of time on that segment/sub-segment, a logical false, is therefore registered. Similarly, if a correct amount of force is applied for a specific segment/sub-segment, a logical true, is registered, while if an incorrect amount of force is determined to be applied, a logical false, is registered. As an illustrative example, a force sensor located on oral hygiene device 100 and/or user device 150, 200 may determine that oral hygiene device 100 and/or user device 200 is cleaning a certain sub-segment at the non-optimal brushing angle of 30-degrees. In this particular scenario, the amount of force applied to the teeth in that sub-segment is not correct, and therefore a logical 0 may be registered for that section.

In one embodiment, a weighted average of each registered output is calculated to determine a total score for a specific region. After the weighted average is calculated to determine the total score, the total score is compared against a pre-defined score for the specific region. If the calculated total score is greater than the pre-defined score, then the individual is instructed to clean a different segment within their mouth. If not, the individual is instructed to modify their cleaning technique until a new total score is calculated which exceeds the pre-defined score. In one embodiment, instructions for how to modify the individual's oral hygiene cleaning technique to improve their total score is provided within window 710. For example, window 710 may include instructions for the user to rotate inter-oral assembly 20 clockwise or counter clockwise, increase pressure or decrease pressure, until the total score calculated exceeds the pre-defined score required for a segment to have been cleaned correctly.

Efficiency meter 708, in the illustrative embodiment, indicates to the individual the efficiency of their cleaning of the current region (e.g., sub-segment 704), within segment 702. At the beginning of cleaning sub-segment 704, meter 708 would, for example, read "Efficiency: 0%," indicating that the individual has not completed cleaning of that sub-segment. Alternatively, this could instead mean that the individual has not completed cleaning of the current segment, however either scenario may be applicable. After the individual has completed half of the cleaning of a particular segment or sub-segment, meter 708 would read, "Efficiency: 50%," meaning that the individual has completed cleaning half of the current sub-segment or segment. After the individual has competed cleaning the entire segment or sub-segment, meter 708 would read, for example, "Efficiency: 100%," indicating that that entire segment or sub-segment has been cleaned correctly. Furthermore, at this point, the individual would be provided guidance to begin cleaning a new, different segment/sub-segment within their mouth.

As mentioned previously, the individual is guided to move inter-oral assembly 20 to a first segment within their mouth, such as segment 702. After inter-oral assembly 20 has been moved to segment 702, a determination is made as to which sub-segment inter-oral assembly 20 is current located within. In the exemplary embodiment, the segment that inter-oral assembly 20 is moved to, or instructed to move to, is highlighted within user interface 700 (e.g., in yellow or green). Segments that the individual is not yet been instructed to move inter-oral assembly 20 to are, therefore, not highlighted. Furthermore, a particular sub-segment where inter-oral assembly 20 is currently located may further be highlighted within user interface 700 (e.g., in yellow or green). This allows the individual to view where inter-oral assembly 20 is within the mouth, as well as see if they have moved inter-oral assembly 20 to the correct location. After an individual has completed cleaning a specific segment or sub-segment, in one embodiment, that segment remains highlighted on user interface 700. For example, after sub-segment 704 is brushed, it will remain highlighted green on user interface 700, so that the individual knows that that particular sub-segment has been cleaned. Segments/sub-segments that have not yet been cleaned, or are not finished being cleaned, remain unlighted within user interface 700 (e.g., sub-segment 706).

Figure 8:
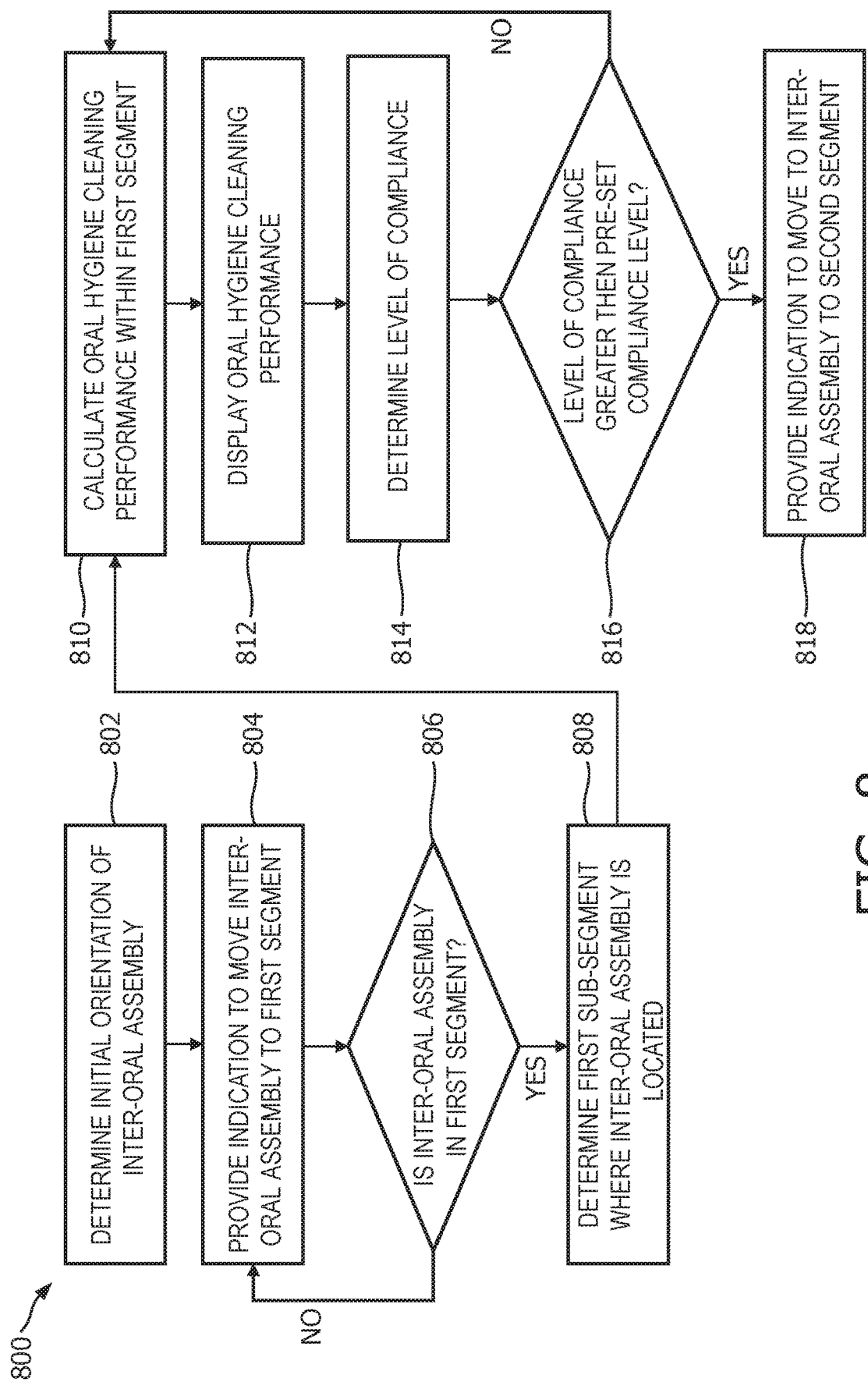
FIG. 8 is an illustrative flowchart of a process 800 for providing brushing guidance based on brushing performance, in accordance with various embodiments.

FIG. 8 is an illustrative flowchart of process 800 for providing guidance to an individual operating oral hygiene device 100 and/or user device 200 based on oral hygiene cleaning performance, in accordance with various embodiments. Process 800 begins, in the illustrative, non-limiting embodiment, at step 802. At step 802, an initial orientation of inter-oral assembly 20 of oral hygiene device 100 and/or user device 200 is determined. Orienting inter-oral assembly 20 within an individual's mouth enables a starting position within the mouth to be known, such that any subsequent movements of oral hygiene device 100 and/or user device 200 can be analyzed with respect to the starting position. Furthermore, orienting inter-oral assembly 20 allows the system to determine a direction of one or more bristles, water picks, flossing features, or any other functionality, of inter-oral assembly 20, such that a direction of inter-oral assembly 20 relative to housing 18 is determined. Angles relative to the longitudinal axis of oral hygiene device 100 and/or user device 200 are then calculable. In one embodiment, guidance, such as an instruction, for the individual to move inter-oral assembly 20 of oral hygiene device 100 and/or user device 200 to the initial position is provided. For example, a message may be displayed on display 216 or I/O interface 110 for the individual to move inter-oral assembly 20 of oral hygiene device 100 and/or user device 200 to an upper right portion of their mouth. By doing this, an initial position of inter-oral assembly 20 within the user's mouth will be known, and therefore subsequent motions of inter-oral assembly 20 can be calculated relative to the initial position.

At step 804, an indication is provided to the individual operating the device to move inter-oral assembly 20 to a first segment within their mouth. For example, after initialization has been performed at step 802, the individual may be prompted to move inter-oral assembly 20 to one of segments 502, 504, 506, 512, 514, and 516. In one embodiment, the individual is provided with the first indication via a message that appears on a display screen (e.g., display screen 216 of user device 150). In another embodiment, the individual is provided the first indication via a haptic response from oral hygiene device 100 and/or user device 150, 200 (e.g., an audible tone, an audible message or command, or a vibration).

At step 806, a determination is made as to whether or not inter-oral assembly 20 is located within the first segment. The one or more motion sensors capture motion sensing data to determine if inter-oral assembly 20 has indeed been moved to the first segment. If so, process 800 proceeds to step 808. However, if not, process 800 returns to step 804 until it is determined that inter-oral assembly 20 is located in the first segment.

At step 808, a first sub-segment within the first segment of where inter-oral assembly 20 is currently located is determined. For example, the individual operating the device is prompted to move inter-oral assembly 20 to segment 504. After determining that inter-oral assembly 20 is indeed located within segment 504, a sub-segment (e.g., sub-segments 304a-304c) within segment 504 where inter-oral assembly 20 is located is determined. For example, inter-oral assembly 20 may be located within sub-segment 304a. The location information of inter-oral assembly 20 may be calculated using sensor(s) 32 located on oral hygiene device 100 and/or user device 200, to determine a position within the individual's mouth that inter-oral assembly 20 corresponds to, based on motion sensing data corresponding to an amount of movement of inter-oral assembly 20 relative to the initial position, as well as an angle of inter-oral assembly 20 relative to gravity, for example.

At step 810, an oral hygiene cleaning performance of the individual operating oral hygiene device 100 and/or user device 200 within the first segment is calculated. The oral hygiene cleaning performance, in one embodiment, is calculated based on whether or not the individual has completed cleaning each sub-segment within the first segment. For example, segment 502 of mouth 500 includes sub-segments 308a and 308b. If the user only cleans sub-segment 308a, the individual's oral hygiene cleaning brushing performance for segment 502 may, for instance, be listed as only 50% complete (e.g., meter 708 of user interface 700 would, therefore, display "Efficiency: 50%"). This particular scenario would then cause the individual to be prompted, or provided, with another indication that additional cleaning within segment 502 is needed in order to improve their oral hygiene cleaning performance. However, if the individual has cleaned both sub-segments 308a and 308b, the calculated oral hygiene cleaning performance for segment 502 would be determined as being 100% complete, or finished, for example.

The oral hygiene cleaning performance is also, in other embodiments, calculated based on an amount of force applied to teeth 302 currently being cleaned. If too much force is applied to teeth 302 within that sub-segment, the individual's oral hygiene cleaning performance for that sub-segment would be calculated as being poor, or low, and additional prompts or indications may be provided to the individual (e.g., within window 710 of user interface 700) as to how to correct the amount of force currently being applied by inter-oral assembly 20 to those teeth 302 within the current sub-segment. The amount of force applied is also, in one embodiment, dependent on an angle of inter-oral assembly 20 in relation to a surface of teeth 302 within the sub-segment being cleaned. For example, if inter-oral assembly 20 is at an angle substantially different than 90-degrees from the plane of the surface of teeth 302 within a sub-segment currently being cleaned, then the amount of force applied to those teeth 302 would not be optimal. In this particular scenario, guidance may be provided (e.g., within window 710 of user interface 700), as to how to modify the angle of inter-oral assembly 20 such that a proper amount of force is applied to those teeth 302 currently being cleaned.

In yet another embodiment, the oral hygiene cleaning performance is calculated based on an amount of time that the individual causes inter-oral assembly 20 to remain within the sub-segment currently being cleaned. The amount of time, as described in this particular scenario, corresponds to an amount of time that cleaning actually occurs, as opposed to an amount of time that inter-oral assembly 20 merely resides within that sub-segment. This determination may, for example, be made in conjunction with one or more force measurements of inter-oral assembly 20 such that the time that cleaning actually occurs is measured. In one embodiment, each tooth, or teeth 302 within a specific sub-segment, has a pre-set amount of time that cleaning is to be performed. If it is determined that the cleaning for that sub-segment is less than the pre-set amount of time, then the individual is provided with guidance, or prompted (e.g., within window 710 of user interface 700), to continue cleaning that sub-segment. In another embodiment, past oral hygiene cleaning performance is used to determine whether or not a modification to the pre-set amount of time of cleaning is needed. For example, if it is determined that the user previously did not clean a particular sub-segment, then the amount of time for the user to clean that sub-segment may be extended. Cleaning teeth 302 located within a current sub-segment for an appropriate amount of time, therefore, causes the oral hygiene cleaning performance that is calculated for that sub-segment to be correct or satisfactory for that sub-segment.

At step 812, the oral hygiene cleaning performance calculated at step 810 is displayed. For example, the oral hygiene cleaning performance may be displayed within user interface 700 on oral hygiene device 100 and/or user device 150, 200. In one embodiment, the oral hygiene cleaning performance that is displayed includes an indication for the individual operating oral hygiene device 100 and/or user device 150, 200 of what actions are needed to improve calculated oral hygiene cleaning performance for that sub-segment (e.g., increase force, rotate angle of inter-oral assembly 20, etc.). In another embodiment, the oral hygiene cleaning performance that is displayed includes additional information, such as which sub-segments or segments the have already been cleaned correctly, or which sub-segments or segments have not yet been cleaned, have been cleaned incorrectly, or have been cleaned below a pre-set compliance level needed for accurate cleaning of that particular sub-segment or segment. Persons of ordinary skill in the art will recognize that additional information may be displayed regarding oral hygiene cleaning performance for a particular segment or sub-segment, and the aforementioned are merely exemplary. Furthermore, additional non-visual indications or feedback may be provided to the user, such as haptic or audible feedback.

At step 814, a level of compliance of the individual's oral hygiene cleaning performance within the first segment is determined. The level of compliance for a particular segment is determined based, at least in part, on the calculations of the oral hygiene cleaning performance of each sub-segment within the first segment, performed at step 810. For example, if only sub-segment 308a within segment 502 has been cleaned, then the level of compliance may be 50%, signifying that half of segment 502 has been cleaned. As another example, sub-segments 308a and 308b within segment 502 have been cleaned, then the level of compliance for segment 502 may be 100%, signifying that all of segment 502 has been cleaned. As yet another example, if sub-segment 308a has been partially cleaned and sub-segment 308b has been fully cleaned, then the level of compliance for segment 502 may be less than 100%, but greater than 50% (e.g., 75%).

At step 816, a determination is made as to whether the level of compliance determined at step 814 is greater than a pre-set compliance level for that particular segment. Continuing the example above, the pre-set compliance for segment 502 may be 70% (e.g., greater than 70% of the teeth within segment 502 have been brushed to a current oral hygiene cleaning performance). Therefore, the level of compliance for segment 502 is compared with the pre-set compliance level for segment 502. If the level of compliance for segment 502 is greater than, or equal to, the pre-set compliance level for segment 502 (e.g., the level of compliance is 100%), then process 800 proceeds to step 818. If, however, the level of compliance for segment 502 is less than the pre-set compliance level (e.g., the level of compliance is 50%), then process 800 returns to step 810, where the oral hygiene cleaning performance within segment 802 is calculated again. In this particular scenario, guidance is provided to the individual operating oral hygiene device 100 and/or user device 150, 200 as to what different cleaning characteristics and procedures are needed to increase the quality of their cleaning such that their level of compliance for that particular segment improves (e.g., increase the amount of time for cleaning teeth within a sub-segment).

At step 818, a new indication is provided to the individual operating oral hygiene device 100 and/or user device 150, 200 to move inter-oral assembly 20 to a different segment within their mouth. For example, after completing cleaning of segment 502, the individual may be provided with an indication to move inter-oral assembly 20 to segment 504. This indication may be provided in the form of a haptic (e.g., vibration) response, an audible response (e.g., a tone or message saying "Move to the next segment"), or a visual response (e.g., a message or arrow displayed within window 710 of user interface 700).

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for providing feedback based on cleaning performance to an individual operating an oral hygiene device, the method comprising:
   determining an initial position of an inter-oral assembly of the oral hygiene device in response to the inter-oral assembly being moved to a first location within a mouth of the individual based on motion sensing data obtained from at least one motion sensor of the oral hygiene device;
   providing a first indication for moving the inter-oral assembly to a first segment within the mouth;
   determining, in response to the inter-oral assembly being moved to the first segment, that the inter-oral assembly is located within a first sub-segment of the mouth based on a generated location estimation and a force-based location guidance, wherein the first segment comprises at least the first sub-segment, and wherein determining that the inter-oral assembly is located within the first sub-segment comprises estimating an orientation of the inter-oral assembly based on an amount of movement detected by the at least one motion sensor relative to the initial position and generating the location estimation of the inter-oral assembly based on the estimated orientation;
   determining a first level of compliance within the first segment based on cleaning by the inter-oral assembly within the first sub-segment, wherein the first level of compliance is based at least in part on an extent to which the first sub-segment has been cleaned; and
   providing feedback based on the cleaning within the first sub-segment.

2. The method of claim 1, further comprising:
   providing a second indication for moving the inter-oral assembly to a second segment within the mouth in response to the first level of compliance being equal to or greater than a pre-set compliance level for the first segment.

3. The method of claim 1, further comprising:
   calculating, prior to determining the first level of compliance, a first cleaning performance within the first segment, wherein calculating comprises at least one of:
      determining a first amount of force that the inter-oral assembly applies to the first sub-segment;
      determining a brushing angle of the inter-oral assembly within the first sub-segment; and
      determining a first amount of time that the inter-oral assembly remains within the first sub-segment.

4. The method of claim 3, wherein providing feedback comprises at least one of:
   displaying the first cleaning performance on a display screen;
   outputting an audible message indicating the first cleaning performance; and
   causing a haptic response to be provided by the oral hygiene device corresponding to the first cleaning performance.

5. The method of claim 1, wherein:
   the provided first indication is given on a segment within the mouth, the segment corresponding to a first level of detail of the mouth; and
   the provided feedback is given on a sub-segment within the mouth, the sub-segment corresponding to a second level of detail of the mouth, wherein the second level of detail is higher than the first level of detail such that the provided feedback is more granular than the provided first indication.

6. The method of claim 1, further comprising:
   calculating a first cleaning performance within the first segment by at least one of:
      determining a brushing angle of the inter-oral assembly within the first sub segment sub-segment;
      determining at least one tooth that the inter-oral assembly is contacting based on the motion sensing data;
      determining a surface of the at least one tooth that the inter-oral assembly is contacting based on the brushing angle;
      determining an amount of time that the inter-oral assembly remains within at least one of the first segment and the first sub-segment; and
      determining a first amount of force based on the determined at least one tooth that the inter-oral assembly is contacting and the determined surface of the at least one tooth that the inter-oral assembly is contacting.

7. The method of claim 1, further comprising:
   determining that the inter-oral assembly is located within a second sub-segment, wherein the first segment further comprises the second sub-segment; and
   displaying, on a display screen, that the inter-oral assembly is located within the second sub segment.

8. The method of claim 1, further comprising:
determining that the inter-oral assembly is located within a second sub-segment, wherein the first segment further comprises the second sub-segment; and
calculating a first cleaning performance within the first segment by at least one of:
  determining an amount of force that the inter-oral assembly applies to at least one tooth within the second sub-segment;
  determining a brushing angle of the inter-oral assembly within the second sub-segment; and
  determining an amount of time that the inter-oral assembly remains within the second sub-segment.

9. The method of claim 8, wherein providing feedback further comprises:
providing feedback based on the calculated first cleaning performance within at least one of the first segment, the first sub-segment, and the second sub-segment.

10. The method of claim 1, further comprising:
providing a second indication for moving the inter-oral assembly to a second segment within the mouth in response to the first level of compliance being equal to or greater than a pre-set compliance level for the first segment;
displaying, prior to providing the second indication, a cleaning performance correction, wherein the cleaning performance correction comprises an adjustment to be made to the inter-oral assembly to improve a first cleaning performance within the first sub-segment;
detecting that the cleaning performance correction has occurred; and
recalculating the first cleaning performance based on the cleaning performance correction.

11. The method of claim 1, further comprising:
calculating, prior to determining the first level of compliance, a first cleaning performance within the first segment by at least one of:
  determining a first amount of force that the inter-oral assembly applies to at least one tooth within the first sub-segment;
  determining a brushing angle of the inter-oral assembly within the first sub-segment; and
  determining a first amount of time that the inter-oral assembly remains within the first sub-segment;
determining a second level of compliance corresponding to operation of the oral hygiene device within the first sub-segment;
determining that the second level of compliance is less than a pre-set compliance level for the first sub-segment;
providing guidance to improve the first cleaning performance; and
recalculating the first cleaning performance within the first segment based, in part, on the provided guidance.

12. The method of claim 11, wherein providing guidance comprises at least one of:
expanding the first amount of time that the inter-oral assembly is to remain in the first sub-segment by an additional amount of time;
generating a first instruction to modify a brushing angle of the inter-oral assembly; and
generating a second instruction to modify an amount of force that the inter-oral assembly is to provide.

13. The method of claim 1, further comprising:
indicating, out of six segments, a second segment within the mouth, the six segments comprising the first segment, the second segment, a third segment, a fourth segment, a fifth segment, and a sixth segment, wherein providing feedback further comprises:
  displaying, on a display screen, the indicated second segment in relation to each of the first segment, the third segment, the fourth segment, the fifth segment, and the sixth segment within the mouth.

14. The method of claim 13, wherein:
the first segment corresponds to an upper right portion of the mouth;
the second segment corresponds to an upper front portion of the mouth;
the third segment corresponds to an upper left portion of the mouth;
the fourth segment corresponds to a lower right portion of the mouth;
the fifth segment corresponds to a lower front portion of the mouth; and
the sixth segment corresponds to a lower left portion of the mouth.

15. An oral hygiene device operable to provide guidance to an individual based on cleaning performance, the oral hygiene device comprising:
a handle portion comprising a power drive system;
an inter-oral assembly;
at least one motion sensor; and
at least one processor operable to:
  determine an initial position of the inter-oral assembly in response to it being determined, using the at least one motion sensor, that the inter-oral assembly has been moved to a first location within a mouth of an individual;
  provide a first indication to move the inter-oral assembly to a first segment within the mouth;
  estimate, using the at least one motion sensor, an orientation of the inter-oral assembly based on an amount of movement relative to the initial position;
  generate a location estimation of the inter-oral assembly based on the estimated orientation;
  determine, based on the generated location estimation and a force-based location guidance, that the inter-oral assembly is located within a first sub-segment of the mouth, wherein the first segment comprises at least the first sub-segment;
  determine a first level of compliance within the first segment based on cleaning by the inter-oral assembly within the first sub-segment, wherein the first level of compliance is based at least in part on an extent to which the first sub-segment has been cleaned, and the first level of compliance is selectable by the individual; and
  provide feedback based on the cleaning within the first sub-segment.

16. The method of claim 1, wherein determining the first level of compliance comprises calculating a total score for the first segment or the first sub-segment, the total score comprising a weighted average of at least two values pertaining to cleaning performance; and further comprising comparing the total score against a pre-defined score for the first segment or the first sub-segment.

17. The oral hygiene device of claim 15, wherein the at least one processor is operable to calculate a total score for the first segment or the first sub-segment, the total score comprising a weighted average of at least two values pertaining to cleaning performance to determine the first level of compliance, and the at least one processor is further operable to compare the total score against a pre-defined score for the first segment or the first sub-segment.

* * * * *